United States Patent
Sinha et al.

(10) Patent No.: US 10,685,455 B2
(45) Date of Patent: Jun. 16, 2020

(54) METHOD AND SYSTEM FOR AUTOMATED VEHICLE CHARGING

(71) Applicant: Stable Auto Corporation, San Francisco, CA (US)

(72) Inventors: Shantanu Sinha, San Francisco, CA (US); James Schiel, San Francisco, CA (US); Rohan Puri, San Francisco, CA (US)

(73) Assignee: Stable Auto Corporation, San Francisco, CA (US)

( * ) Notice: Subject to any disclaimer, the term of this patent is extended or adjusted under 35 U.S.C. 154(b) by 0 days.

(21) Appl. No.: 16/400,799

(22) Filed: May 1, 2019

(65) Prior Publication Data

US 2019/0340782 A1 Nov. 7, 2019

Related U.S. Application Data

(60) Provisional application No. 62/665,970, filed on May 2, 2018, provisional application No. 62/666,581, filed on May 3, 2018.

(51) Int. Cl.

| | | |
|---|---|---|
| *G06K 9/00* | (2006.01) | |
| *G06T 7/73* | (2017.01) | |
| *H04N 5/232* | (2006.01) | |
| *G06T 7/13* | (2017.01) | |

(Continued)

(52) U.S. Cl.
CPC .............. *G06T 7/73* (2017.01); *B60L 53/37* (2019.02); *G06K 9/00624* (2013.01); *G06T 7/13* (2017.01);

(Continued)

(58) Field of Classification Search
CPC . G06T 2207/30252; G06T 2207/30244; G06T 2207/20084; G06T 7/73;

(Continued)

(56) References Cited

U.S. PATENT DOCUMENTS

| | | | | |
|---|---|---|---|---|
| 5,544,256 A | * | 8/1996 | Brecher | G06T 7/0006 |
| | | | | 382/149 |
| 7,181,066 B1 | * | 2/2007 | Wagman | G06K 7/14 |
| | | | | 235/462.08 |

(Continued)

FOREIGN PATENT DOCUMENTS

| | | | | | |
|---|---|---|---|---|---|
| EP | 002680224 | * | 2/2012 | | G06T 7/00 |
| EP | 002680224 | * | 1/2014 | | G06F 7/00 |

OTHER PUBLICATIONS

Ren, Shaoqing et al., "Faster R-CNN: Towards Real-Time Object Detection with Region Proposal Networks", Jan. 6, 2016, https://arxiv.org/abs/1506.01497, 14 pages.

(Continued)

*Primary Examiner* — Amara Abdi
(74) *Attorney, Agent, or Firm* — Jeffrey Schox; Diana Lin

(57) ABSTRACT

A method for facilitating automated vehicle charging, which can include one or more of: detecting a charge port cover, determining a cover actuation point, opening the cover, locating a charging connector of the vehicle, locating electrical pins of the charging connector, connecting to the vehicle, and/or disconnecting from the vehicle. A system for facilitating automated vehicle charging, which can include one or more connectors, sensors, and/or actuators. The system is preferably configured to perform the method (e.g., in the presence of an electric vehicle).

20 Claims, 10 Drawing Sheets

(51) Int. Cl.
    *G06T 7/64* (2017.01)
    *B60L 53/37* (2019.01)
(52) U.S. Cl.
    CPC ............ *G06T 7/64* (2017.01); *H04N 5/23299* (2018.08); *G06T 2207/20084* (2013.01); *G06T 2207/30244* (2013.01); *G06T 2207/30252* (2013.01)
(58) Field of Classification Search
    CPC ......... G06T 7/13; G06T 7/64; G06K 9/00624; H04N 5/23299; B60L 53/37
    See application file for complete search history.

(56) References Cited

U.S. PATENT DOCUMENTS

| | | | |
|---|---|---|---|
| 8,853,999 B2 | 10/2014 | Haddad et al. | |
| 9,373,057 B1* | 6/2016 | Erhan | G06K 9/6202 |
| 9,514,389 B1 | 12/2016 | Erhan et al. | |
| 2014/0067660 A1 | 3/2014 | Cornish | |
| 2016/0144735 A1* | 5/2016 | Haddad | B60L 53/665 320/109 |
| 2018/0253050 A1* | 9/2018 | Otani | G03G 15/5058 |

OTHER PUBLICATIONS

International Search Report and Written Opinion for PCT Application No. PCT/US2019/030249 dated Aug. 9, 2019.

Miseikis, Jet al. "3D Vision Guided Robotic Charging Station for Electric and Plug-in Hybrid 5-7-Vehicles". Cornell University. Mar. 15, 2017 [retrieved Jun. 27, 2019]. Retrieved from the Internet<URL: https://arxiv.org/abs/1703.05381>.

* cited by examiner

METHOD AND SYSTEM FOR AUTOMATED VEHICLE CHARGING

CROSS-REFERENCE TO RELATED APPLICATIONS

This application claims the benefit of U.S. Provisional Application Ser. No. 62/665,970, filed on 2 May 2018, and U.S. Provisional Application Ser. No. 62/666,581, filed on 3 May 2018, each of which is incorporated in its entirety by this reference.

TECHNICAL FIELD

This invention relates generally to the vehicle charging field, and more specifically to a new and useful method and system in the vehicle charging field.

BACKGROUND

Electric vehicles can be charged by connection to a vehicle charging connector. However, in typical systems and methods, such connectors are connected to the vehicles manually, thereby requiring human intervention. Thus, there is a need in the vehicle charging field to create a new and useful method and system for automated vehicle charging.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
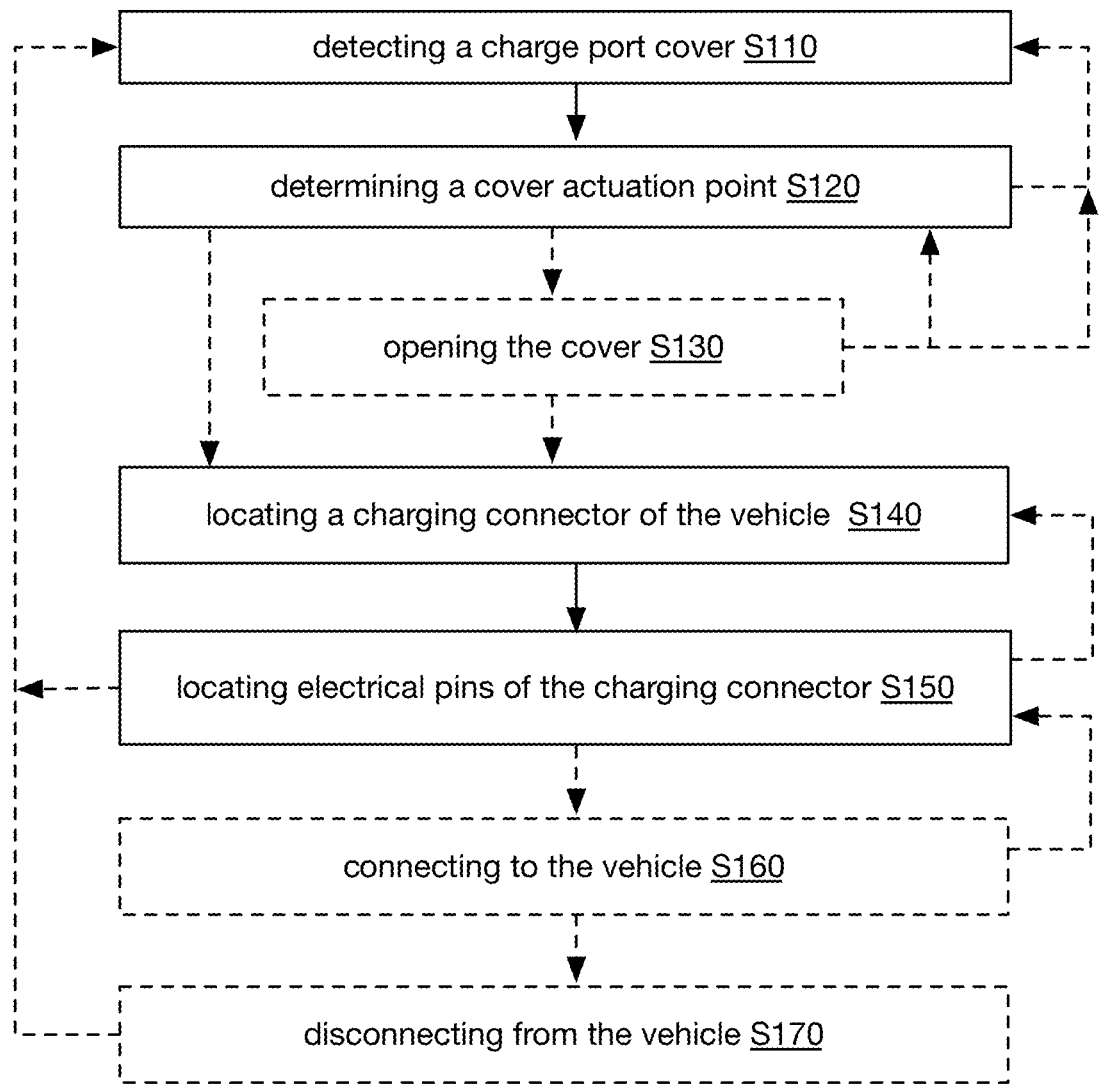
FIG. 1 is a flowchart representation of an embodiment of the method.

A method 100 for automated vehicle charging preferably includes (e.g., as shown in FIG. 1): detecting a charge port cover S110, determining a cover actuation point S120, locating a charging connector of the vehicle S140, and locating electrical pins of the charging connector S150. The method 100 can additionally or alternatively include: opening the cover S130, connecting to the vehicle S160, disconnecting from the vehicle S170, and/or any other suitable elements. The method 100 is preferably performed using a system 200 for automated vehicle charging (e.g., as described below), but can additionally or alternatively be performed using any other suitable system.

2. Benefits.

The method 100 and/or system 200 can confer several benefits. First, embodiments of the method and/or system can enable autonomous detection of and/or interaction with an electric vehicle charging port (and/or associated elements of the vehicle, such as a charging port cover). Second, embodiments of the method and/or system can overcome typical challenges associated with computer vision, such as challenges associated with reflections and/or obstructions. Third, embodiments of the method can be performed using a simple inexpensive sensor, such as a monocular camera (e.g., greyscale camera, color camera, etc.), thereby reducing system costs and/or increasing reliability as compared with systems that require more expensive and/or complex sensors. However, the method and/or system can additionally or alternatively confer any other suitable benefits.

3. System.

The system 200 preferably includes one or more connectors, sensors, and/or actuators, more preferably including only one of each, and optionally includes one or more computing modules. However, the system can additionally or alternatively include any other suitable elements.

The connector (e.g., electrical charging connector) is preferably a plug (e.g., in embodiments in which the electric vehicle includes an electrical charging socket) but can additionally or alternatively include a socket and/or any other suitable connector. The connector is preferably connected (e.g., electrically) to a charging cable and/or electrical power source, but can additionally or alternatively receive electrical power (and/or receive any other suitable elements) in any suitable manner. The connector is preferably a standard charging connector (e.g., SAE J1772 connector, such as the Combined Charging System variant; CHAdeMO connector; etc.), but can additionally or alternatively include any other suitable DC, AC, and/or data connector. The connector is preferably coupled (e.g., mechanically connected to, such as mounted on) an actuator of the system (e.g., wherein the actuator is operable to move the connector relative to a vehicle to be charged), but can additionally or alternatively be coupled to the system in any other suitable manner.

The sensor is preferably a camera, more preferably a digital camera (e.g., CCD camera, CMOS camera, etc.; camera configured to deliver sampled information to a computing module, such as in near-real time). The camera is preferably a monocular camera, which can function to reduce camera weight and/or cost; however, the camera can alternatively include a stereoscopic camera, camera array, multiple cameras, and/or any other suitable number of cameras and/or camera sensors in any suitable arrangement. The camera can be a greyscale camera (e.g., which can function to reduce camera cost), a color camera (e.g., configured to independently detect multiple light wavelength ranges), and/or any other suitable type of camera. The camera preferably detects visible light, but can additionally or alternatively detect IR light, UV light, and/or any other suitable wavelengths of light. In some embodiments, the camera includes a wide-angle lens (e.g., standard wide-angle lens, very-wide-angle rectilinear lens, fisheye lens, etc.), but can additionally or alternatively include one or more lenses of any suitable focal lengths. The sensor can additionally or alternatively include a time-of-flight sensor (e.g., lidar, radar, sonar, optical rangefinder, etc.) and/or any other suitable type of sensor.

The sensor is preferably coupled to (e.g., mechanically connected to, such as mounted on) an actuator of the system (e.g., wherein the actuator is operable to move the sensor relative to a vehicle to be charged), more preferably on the same actuator to which the connector is coupled (e.g., mechanically connected, such as mounted on) but alternatively a separate actuator. Alternatively, the sensor can be arranged in a fixed position. For example, the sensor can be substantially static relative to a vehicle in use with the system, wherein the method 100 can include analyzing different image portions (e.g., in place of moving the sensor). However, the sensor can be arranged in any other suitable manner.

The actuator (e.g., mechanical actuator, such as an articulated robot arm, linear and/or rotary actuator, etc.) preferably functions to control motion of the connector and/or sensor (e.g., relative to the vehicle, to each other, etc.). The system preferably includes a single actuator operable to move both the connector and the sensor, but can alternatively include: multiple actuators, each operable to move a subset of the system elements; a single actuator operable to move the connector and not the sensor; and/or any other suitable set of actuators. The connector and sensor (e.g., in embodiments in which both are attached to a single actuator) can be fixed or substantially fixed relative to each other (e.g., rigidly coupled to each other), preferably wherein the spatial relationship between the connector and sensor is known (e.g., determined via a calibration process), can be moveable with respect to each other (e.g., coupled by a flexible linkage, such as one operable to passively flex; coupled by a system-controllable aspect of the actuator, such as one or more linear and/or rotary actuation elements; etc.), and/or coupled in any other suitable manner.

The actuator(s) can optionally control motion (e.g., of the connector, sensor, etc.) along any suitable translation and/or rotation axes. In one embodiment, the actuator is operable to control large-scale motion in three translation axes (e.g., x, y, and z axes) and at least one rotational axis (e.g., yaw axis, such as rotation about an axis substantially parallel to a gravity vector and/or substantially normal to a road or other vehicle support surface), such as by including wide-range actuators corresponding with these axis and/or by including rotational actuators (e.g., about three orthogonal axes) operable to control motion corresponding with these axes (e.g., wherein the control instructions for the rotational actuators are determined using an inverse kinematics solver). In a first variation of this embodiment, the actuator is further operable to enable (e.g., control, such as via rotational actuators; compliantly allow, such as via the flexible linkage; etc.) small-scale motion about one or two additional rotation axes (e.g., pitch and/or roll axes, such as wherein the roll axis is a longitudinal axis defined by the vehicle, such as a central longitudinal axis and/or any other axis substantially aligned with a forward motion direction of the vehicle, and wherein the pitch axis is orthogonal to the yaw and roll axes). In a second variation, the actuator does not control actuation about any additional rotation axes. In a third variation, the actuator is further operable to control large-scale motion about additional rotation axes, although such large-scale motion may not be necessary to perform the method 200 (e.g., because road-going vehicles tend to remain within a small range of pitch and roll orientations with respect the road). However, the actuator(s) can additionally or alternatively control motion along any other suitable axes.

The system (e.g., the actuator thereof) can optionally include one or more auxiliary sensors. For example, the actuator can include one or more force sensors (e.g., configured to sample force exerted by and/or on the actuator, such as total force, force along one or more axes, etc.). However, the system can additionally or alternatively include any other suitable auxiliary sensors in any suitable arrangement.

The computing module (e.g., processor, computer memory, etc.) can be a local module (e.g., collocated with and/or mechanically connected to the sensor, connector, and/or actuator; wired to the sensor, connector, and/or actuator, such as by one or more data and/or power connections; etc.), a remote module (e.g., remote computing system, such as a computing system operable to communicate with the sensor, connector, and/or actuator over the internet), and/or can have any other suitable relationship with the other elements of the system. The computing module is preferably operable to receive measurements (e.g., images) from the sensor; analyze the measurements (e.g., according to the method 200); and/or control the other elements of the system (e.g., the actuator), such as based on the analysis. However, the computing module can additionally or alternatively be operable to perform any other suitable functions, and the system can additionally or alternatively include any other suitable elements in any suitable arrangement.

4. Method.

4.1 Detecting a Charge Port Cover.

Detecting a charge port cover S110 preferably functions to locate a cover associated with a charging connector of a vehicle to be charged. S110 can be performed in response to: detecting a vehicle near the system (e.g., parked in a designated charging location, parked next to the system, etc.), receiving a request to charge a vehicle (e.g., received from a computing device, such as a user device, a computing device of the vehicle, a remote computing system, etc.; received at a physical input element, such as a button of the system, etc.), and/or any other suitable trigger(s). S110 preferably includes sampling a measurement indicative of a vehicle and analyzing measurement data to locate the cover, and can additionally or alternatively include determining auxiliary information associated with the vehicle, arranging the sensor near the vehicle, and/or any other suitable elements.

Determining auxiliary information associated with the vehicle can function to provide additional information, which may assist performance of other elements of the method. The auxiliary information can include, for example, the charging connector type, vehicle model (e.g., based on which, additional information can be determined, such as the cover shape, size, and/or position relative to other vehicle features; charging connector type; etc.), and/or any other suitable information. Such information can be determined via computer vision techniques and/or other sensor information analysis techniques (e.g., determining the vehicle model based on the vehicle shape, looking up the model based on the vehicle license plate and/or other identifier, etc.), via communication with another entity, such as the vehicle or a computing device associated with the vehicle and/or user (e.g., received as or in addition to a request to charge the vehicle, received in response to an information request sent by the system, etc.), and/or determined in any other suitable manner.

Arranging the sensor near the vehicle can function to enable sensor measurements of the vehicle. For example, in an embodiment in which the system enters a waiting configuration (e.g., compact and/or stowed configuration) while not charging and/or preparing to charge a vehicle, S110 can include controlling the actuator to move the system from the waiting configuration to an active configuration (e.g., in which the sensor is positioned to sample measurements associated with the vehicle, such as wherein a camera view region includes the vehicle). Alternatively, the system can remain substantially in the active configuration (and/or any other suitable configuration) when not charging a vehicle (e.g., wherein the vehicle drives into the sampling region of the sensor to enable performance of the method).

S110 preferably includes sampling a measurement indicative of the vehicle, more preferably indicative of the cover. The measurement is preferably sampled at the sensor, but can additionally or alternatively be sampled by any other suitable elements. The measurement is preferably an image of the vehicle, but can additionally or alternatively include any other suitable sensor information (e.g., 3 dimensional spatial information, 2 dimensional information other than images, non-spatial information, etc.). For example, the method can include, at a camera of a vehicle charging system, capturing an image depicting a portion of a vehicle, the portion comprising a cover arranged between the camera and a charging connector of the vehicle. Measurements indicative of the vehicle are preferably sampled throughout performance of the method, such as sample continuously or pseudo-continuously, periodically, sporadically, in response to triggers (e.g., the beginning and/or end of one or more elements of the method; before, during, and/or after actuator motion; etc.), and/or with any other suitable timing. However, the measurement can alternatively be sampled only a single time (e.g., after arranging the sensor near the vehicle).

Analyzing measurement data to locate the cover preferably functions to determine the position of the cover as represented by the measurement data (e.g., position within the image, position relative to the sensor, etc.). Analyzing the measurement data preferably includes analyzing the measurement(s) sampled as described above, such as performing computer vision and/or other image analysis techniques on images sampled by the camera. The measurement data is preferably analyzed by the computing module(s), but can additionally or alternatively be analyzed by any other suitable elements. The measurement data is preferably analyzed in response (e.g., immediately in response) to sampling the measurement and/or receipt of the measurement data (e.g., from the sensor, from another computing and/or communication module, etc.), but can additionally or alternatively be analyzed at any other suitable time.

Figure 2A:
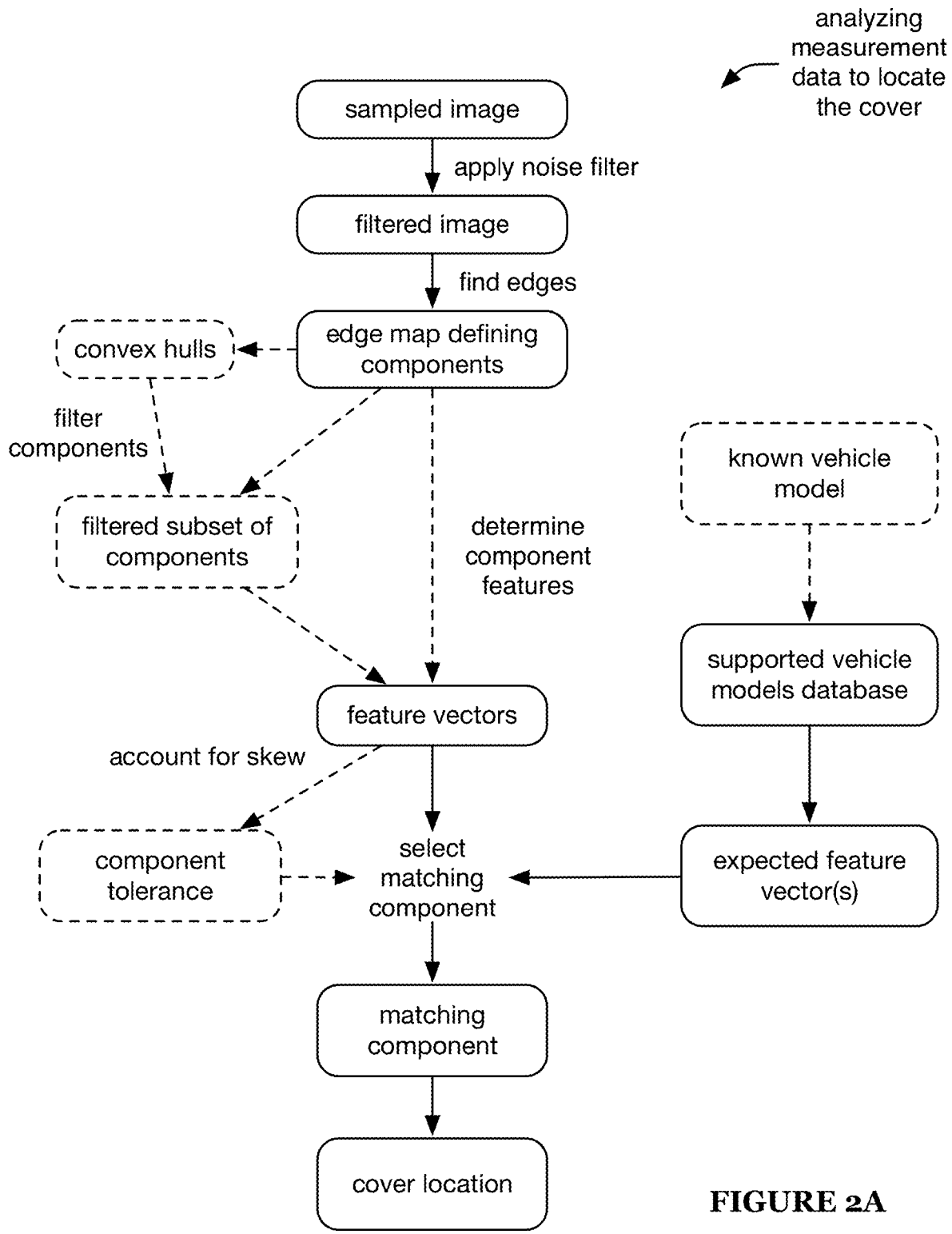
FIG. 2A is a flowchart representation of an embodiment of locating a cover.

In a first embodiment, the measurement data includes image data. In this embodiment, analyzing the measurement data preferably includes applying a noise filter, finding edges, determining component features, and selecting a component based on the features, and can additionally or alternatively include determining convex hulls, filtering components, accounting for skew, and/or any other suitable elements (e.g., as shown in FIG. 2A).

Some variations of this embodiment include using one or more additional computer vision techniques to determine (e.g., estimate) one or more possible cover locations within the image data (e.g., determining a location of a depiction of the cover within the image). These variations preferably include using the possible cover location(s) to determine a subset of the image that contains the cover depiction. For example, an additional computer vision technique can be used to predict a location of a depiction of the cover within the image, and then, based on the location, the method can include determining a subset of the image, wherein the subset depicts the cover (or is expected to depict the cover).

In a first example, the additional computer vision technique outputs a single region as the possible cover location, and the subset is determined based on the region. In a first specific example, the subset is equivalent to the region. In a second specific example, the subset is scaled (increased or decreased in size) relative to the region (preferably while maintaining the position and orientation of the region, such as wherein the subset has the same center and orientation as the region), such as by a predetermined absolute amount (e.g., 10, 20, 50, 100, 200, 500, 1000, 1-10, 10-30, 30-100, 100-300, or 300-1000 pixels, etc.), amount relative to the overall image size (e.g., 1, 2, 5, 10, 20, 30, 0.3-1, 1-3, 3-10, 10-20, 20-30, or 30-50%, etc.) or the region size (e.g., 10, 20, 50, 75, 100, 130, 200, 250, 300, 350, 400, 500, 1-10, 10-30, 30-100, 100-200, 200-300, 300-500, or 500-1000%, etc.). The amount by which the size is changed can be the same or different along different orientations (e.g., the subset can have a different aspect ratio than the region). For example, the subset can be 3 times larger than the region along a first direction (e.g., vertical direction) and 3.25 times larger than the region along a second direction (e.g., horizontal direction), preferably a direction substantially orthogonal to the first direction.

In a second example, the additional computer vision technique outputs a single point as the possible cover location, and the subset is determined based on the point (e.g., region centered on the point, such as a region of a predetermined size and/or orientation).

In a third example, the additional computer vision technique outputs a plurality of points and/or regions, each representing a possible cover location. In a first specific example, a subset of the image including all such points and/or regions is determined (e.g., union of the regions, circumscribed shape or convex hull, etc.); whereas in a second specific example, a separate subset of the image is determined in association with each such point and/or region (e.g., as described above regarding the first and/or second examples).

In these variations, the additional computer vision techniques preferably include using one or more neural networks (e.g., providing image data as an input to and/or receiving outputs from the neural network(s)) and/or other machine learning tools. The machine learning tools are preferably trained based on information (e.g., measurements and/or simulated measurements, such as images) associated with the vehicle model (or a set of supported vehicle models, such as in embodiments in which the model of the vehicle to be charged is unknown). The neural networks preferably include one or more convolutional neural networks (CNNs), more preferably region-based CNNs (e.g., such as described in Ren, Shaoqing, Kaiming He, Ross Girshick, and Jian Sun, "Faster R-CNN: Towards real-time object detection with region proposal networks", in *Advances in neural information processing systems*, pp. 91-99 (2015), which is hereby incorporated in its entirety by this reference), but can additionally or alternatively include any other suitable neural networks.

The neural network inputs can include image data provided as a single intensity channel and/or as one or more color-based channels (e.g., 3 channels, corresponding to red, green, and blue intensity, respectively). The neural network inputs can additionally or alternatively include derivative image data, such as one or more gradient channels (e.g., gradient of the overall intensity, gradient of each color channel, etc.), edge channels (e.g., binary pixels representing presence or absence of an edge, pixel intensity corresponding to likelihood that a particular pixel lies on an edge element, etc.), and/or any other suitable channels. The neural network inputs can additionally or alternatively include information determined based on multiple images (e.g., difference between a first image and a second image, such as an image sampled before or after the first image by a predetermined range of time). The neural network inputs can additionally or alternatively include any other suitable information associated with the image (e.g., image metadata; auxiliary sensor measurements, such as measurements sampled substantially concurrent with the image; etc.). In a specific example, the neural network inputs include three color intensity channels (e.g., corresponding to red, green, and blue, respectively) and a single gradient channel (e.g., corresponding to the gradient of the overall intensity). However, the neural network inputs can additionally or alternatively include any other suitable information.

Figure 2B:
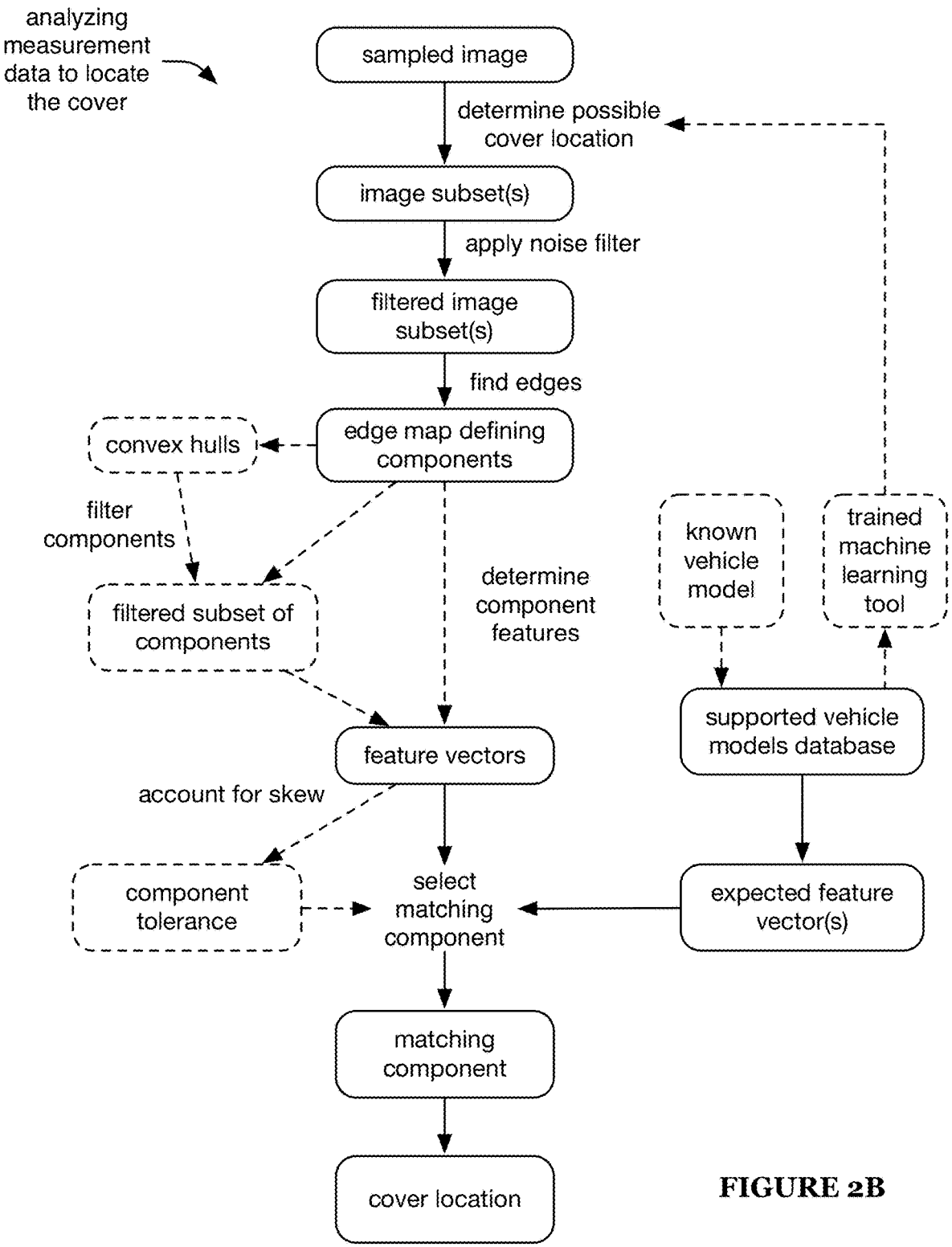
FIGS. 2B-2C are flowchart representations of a variation of the embodiment and an example of the variation, respectively.
Figure 2C:
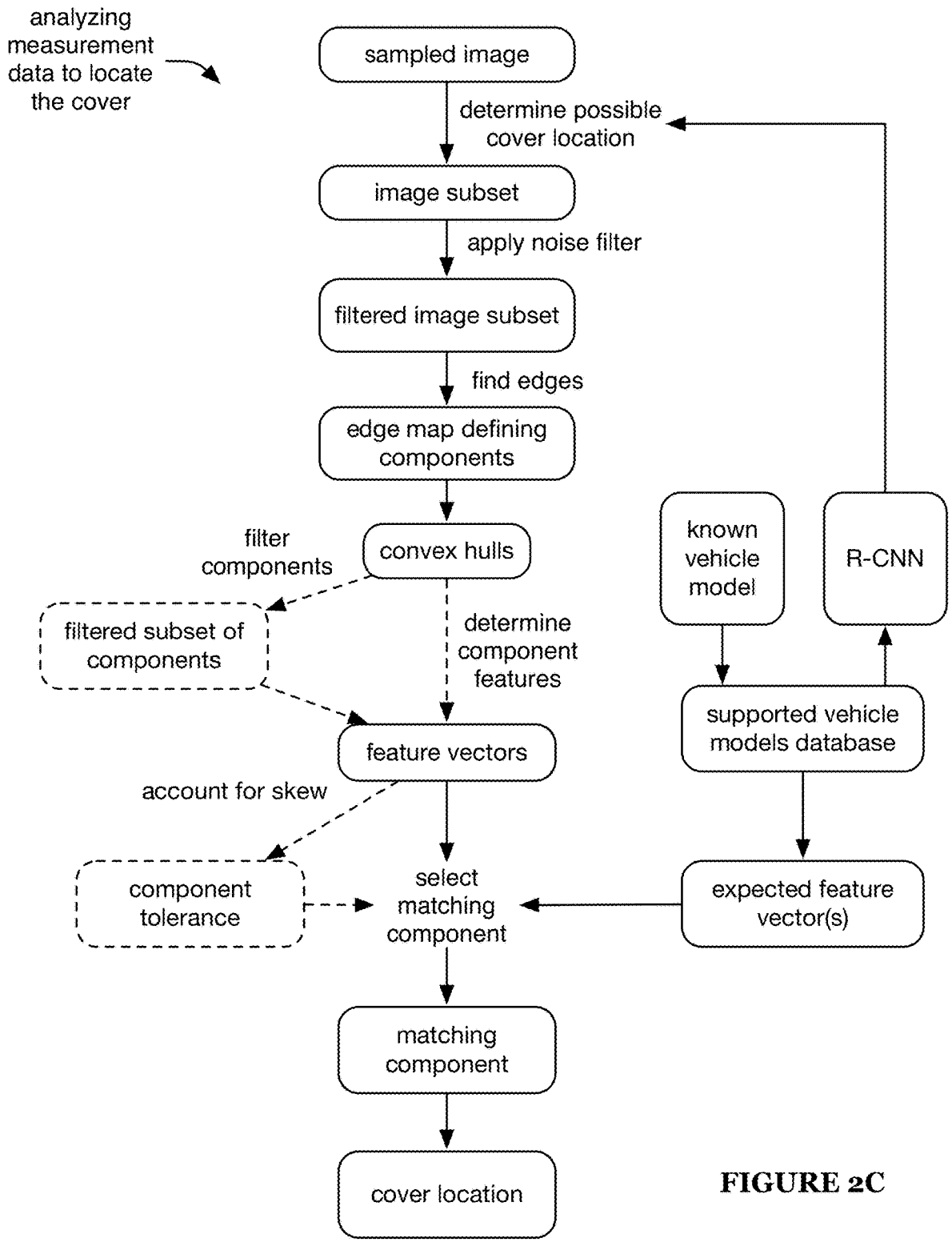

The additional computer vision technique(s) are preferably used before performing one or more elements of analyzing the measurement data described above (e.g., wherein subsequent elements are performed based on the possible cover locations determined by the additional computer vision techniques. More preferably, the additional computer vision techniques are performed before performing any of the elements described above (e.g., wherein the subsequent elements are performed only within the possible cover location(s) of the image, rather than performed for the entire image), such as shown by way of example in FIGS. 2B and/or 2C. However, analyzing the measurement data can additionally or alternatively include using any other suitable computer vision techniques in any suitable manner and/or with any suitable timing, and/or can include using no such additional computer vision techniques.

Applying a noise filter preferably functions to remove noise from the sampled image (or a subset thereof, such as the subset determined as described above regarding additional computer vision techniques). Applying the noise filter preferably generates a filtered image based on the sampled image. The noise filter can include a median filter, a Gaussian blur, and/or any other suitable filter.

Finding edges preferably functions to locate components of the image. Finding edges preferably determines an edge map based on an input image. The input image is preferably the filtered image (e.g., entire sampled image or subset thereof, to which the noise filter has been applied), but can additionally or alternatively include the sampled image (or a subset thereof, such as the subset determined as described above regarding additional computer vision techniques) and/or any other suitable images. The edge map can define a set of one or more components (e.g., regions within a closed edge or a substantially closed edge) of the image. Edge finding can be performed using a search-based technique, a zero-crossing based technique, and/or any other suitable edge finding technique.

The found edges can optionally be dilated (e.g., grown), preferably along their length but additionally or alternatively along their width and/or in any other suitable directions. Edge dilation can function to close gaps between edges, such as gaps arising from reflections and/or obstructions along the cover edge (e.g., thereby recovering closed components that were open before dilation, such as a component associated with the cover).

Figure 4:
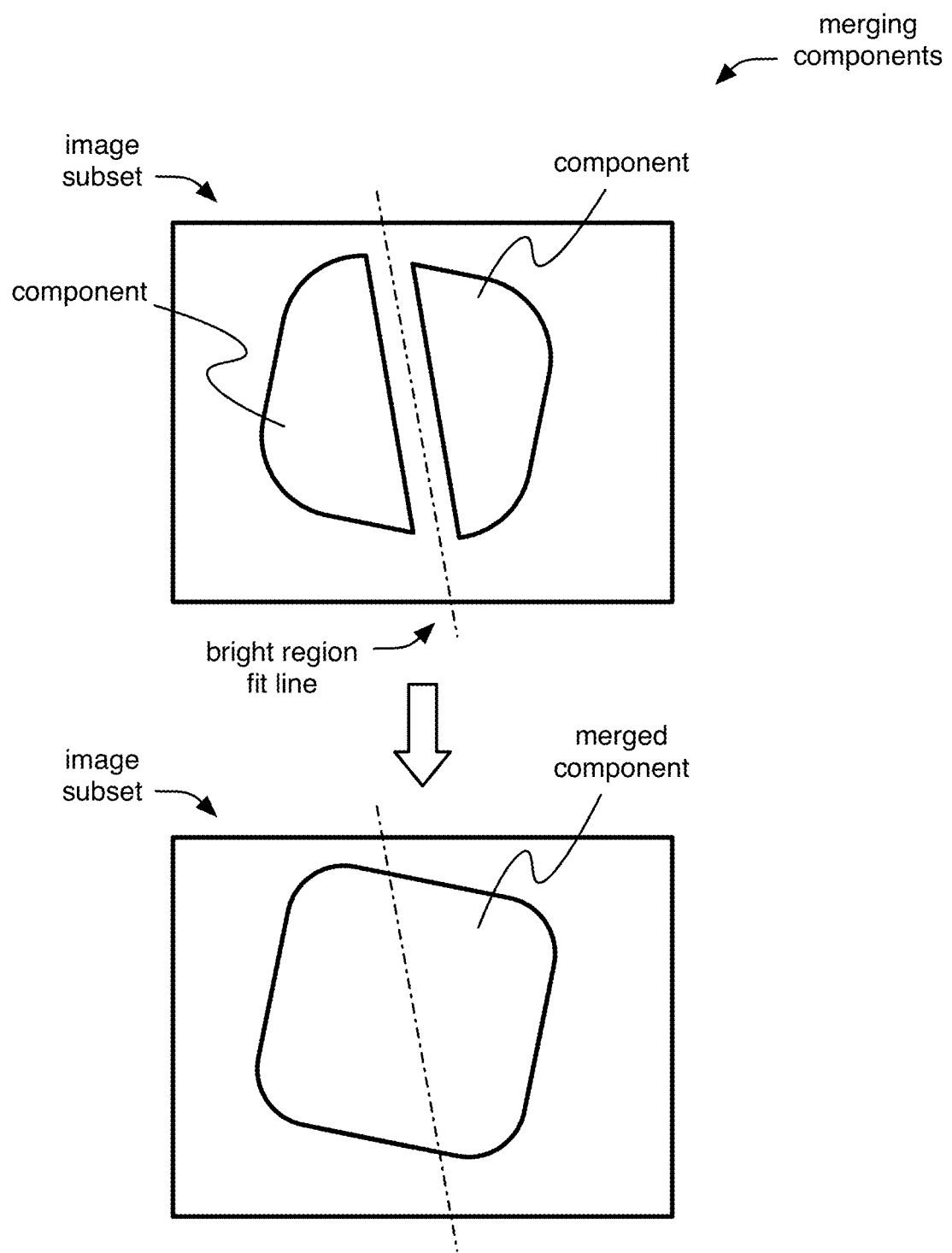
FIG. 4 is a schematic representation of an example of merging components.

Some or all of the components defined by the edge map can optionally be merged into one or more merged components. Such component merging can be used, for example, to compensate for lens flare artifacts in the image, which may typically present as regions of high brightness. In one embodiment, merging components includes: detecting a lens flare within the image; selecting a plurality of components near the detected lens flare as merge candidates (if any such components are suitable for merging); and/or merging the selected plurality of components; such as shown by way of example in FIG. 4.

Detecting a lens flare can include detecting a bright image region, which includes detecting an image region (e.g., of more than a threshold size) with brightness greater than a threshold value (e.g., all pixels of the region exceed the threshold; at least a threshold number of pixels of the region, such as 70, 80, 90, 50-75, 75-90, or 90-100% of the pixels, exceed the threshold; the average brightness of the region exceeds the threshold, etc.). In some variations, detecting the lens flare includes (e.g., after or instead of detecting a bright region in the first image): sampling an additional image (e.g., with the camera in substantially the same arrangement as for the sampling of the original image) using a different exposure setting (e.g., lower-sensitivity setting) and detecting a bright region within the second image, preferably in substantially the same location as the bright region of the first image (e.g., wherein the lens flare is considered to be detected in response to detecting the bright region in the second image, in response to determining that the bright regions substantially overlap, etc.). Detecting the lens flare optionally includes fitting a curve (e.g., straight line, quadratic curve, ellipsoidal curve, etc.) to the bright region.

Selecting a plurality of components preferably functions to select two (or more) components that may have been artificially separated by the lens flare (e.g., wherein the components are associated with a single feature of the vehicle, and the lens flare artifact has altered the depiction of that feature). The components preferably border the lens flare (or substantially border the lens flare, such as coming within a threshold distance of the lens flare). The components are preferably well-aligned with each other across the lens flare (e.g., the edges of the two components point toward regions near each other across the lens flare, the components border substantially the same portions of the lens flare as each other, etc.). In some variations, determining whether two components are suitable merge candidates includes determining what portion of the first component's lens flare-adjacent edge is aligned with the second component's lens flare-adjacent edge (and/or vice versa). In some examples, this can be determined based on the curve fit to the bright region associated with the lens flare. For example, each point (e.g., pixel) along the fit curve, the portions of the image normal to the fit curve (e.g., regions adjacent to and on either side of the curve) can include: neither component, only the first component (on the first side of the curve), only the second component (on the second side of the curve), or both components (one on each side of the curve). If the amount of the curve for which both components are adjacent exceeds a threshold value (e.g., relative to the amount for which only one curve is present, relative to the total curve length, etc.), the components can be selected as suitable merge candidates. However, the plurality can additionally or alternatively be selected in any other suitable manner.

Merging the selected plurality of components preferably includes combining the components of the selected plurality into a single merged component, more preferably also adding some of the lens flare's bright region (e.g., the portion adjacent to both components, the portion adjacent to either component, etc.) to the merged component. In one example, merging the components can include extending the edges of each component (e.g., along a tangent line, along a curve fit to the edge, etc.) until it intersects another curve (e.g., an edge or extended edge of the other component, the curve fit to the lens flare's bright region, etc.). However, the selected plurality of components can additionally or alternatively be merged in any other suitable manner.

In some embodiments, the edge map (or a subset thereof, such as one or more edges of the edge map and/or components defined by the edge map) is tested (e.g., for validity or presumed validity) based on one or more criteria. In some variations (e.g., in which the edge map is determined for an image subset expected to depict the cover, such as a subset determined using additional computer vision techniques as described above; additionally or alternatively, in which the edge map is determined for the entire image and/or any other suitable subset thereof), such testing can include comparing one or more edge metrics, such as a total extent (e.g., edge length, number of edge pixels, etc.) of one or more edges within the edge map, to a threshold amount or range (e.g., expected range). The edges used for such testing can include all edges of the edge map, edges associated with a particular component (e.g., a largest component defined by the edge map; a component closest to an expected value or set of expected values; etc.), and/or any other suitable edge(s).

The threshold amount or range preferably represent an amount expected to correspond to the edge of the cover to be detected. The threshold amount or range can be fixed (e.g., for all circumstances, such as a single predetermined value), and/or can be determined based on one or more of: edge map size (e.g., size of the image from which the edge map was determined), such as absolute size (e.g., in pixels) and/or size relative to the overall image (e.g., ratio of the overall image size to the image subset); vehicle model; component characteristics (e.g., circularity, eccentricity, etc.), such as one or metrics described below; and/or any other suitable information.

In these embodiments, if the test is failed (e.g., if one or more of the edge metrics falls outside the expected range or more than a threshold distance from the expected value), the edge map is preferably discarded and a new edge map is preferably determined. The new edge map is preferably determined in a different manner than the discarded edge map, such as by changing one or more segmentation parameters (e.g., using a different edge detection threshold). For example, if the tested edge map (or the tested edge(s) thereof) has significantly fewer edge pixels than expected (e.g., less than the minimum value of the expected range), the new edge map can be generated using a lower edge detection threshold (a threshold for which a greater number of edge pixels will be detected); whereas, if the tested edge map (or the tested edge(s) thereof) has significantly more edge pixels than expected (e.g., more than the maximum value of the expected range), the new edge map can be generated using a higher edge detection threshold (a threshold for which a lesser number of edge pixels will be detected). The edge map testing process is preferably repeated for the new edge map (e.g., possibly repeating multiple times, until an edge map satisfying the test is generated). The edge map testing is preferably performed after determining the edge map (e.g., and before processing and/or filtering the edge map, such as described below), but can additionally or alternatively be performed after determining convex hulls, filtering components, determining component features, selecting a matching component, and/or with any other suitable timing.

In one example, a subset of the image has been selected for analysis (e.g., using a CNN or other computer vision technique, such as described above), and a first set of edges have been detected within the subset using a first edge detection threshold. In this example, performing the testing can include: determining a first edge pixel count based on the first set of edges (e.g., based on all edges of the set, based on a largest component of the set, etc.); determining that the first edge pixel count is not within an expected edge pixel count range (e.g., is greater than the maximum value, is less than the minimum value); in response to determining that the first edge pixel count is not within the expected edge pixel count range, and determining a second edge detection threshold (different from the first) based on the first edge pixel count (e.g., if the first edge pixel count is too low, using a lower threshold, or if the first edge pixel count is too high, using a higher threshold; preferably selecting the second threshold to achieve a passing edge pixel count). This example preferably includes using the second edge detection threshold, detecting (e.g., in response to determining that the first edge pixel count is not within the expected edge pixel count range) a second set of edges within the subset of the image (e.g., wherein the second set of edges are used for subsequent elements of the method). This example can optionally include, based on the second set of edges, determining a second edge pixel count, and determining whether the second edge pixel count is within the expected edge pixel count range. If the second edge pixel count is within the expected edge pixel count range, the second set of edges is preferably used for subsequent elements of the method, whereas if it is not, a third threshold is preferably determined and used to determine a third set of edges (e.g., analogous to determination and use of the second threshold), and so on. However, the testing can additionally or alternatively be performed in any other suitable manner (or can not be performed).

The analysis can optionally include determining the convex hull of one or more of the components (e.g., each component of the edge map, each component of a filtered subset of components, etc.). This can function to eliminate spurious concavities of the components (e.g., in embodiments in which the cover is convex), such as concavities due to reflections and or obstructions. The convex hulls are preferably determined before determining component features, and can be determined before and/or after filtering the components. However, the convex hulls can additionally or alternatively be determined any other suitable time.

The analysis can optionally include filtering the components (e.g., determining a filtered subset of the components), which can function to remove some components not associated with the cover (e.g., components associated with reflections, obstructions such as dirt and/or grime, vehicle damage, etc.). A component can be filtered based on metrics associated with the component and/or its convex hull. The components can be filtered based on metrics exceeding a maximum value, falling below a minimum value, and/or failing to conform to the expected values in any other suitable manner.

The components can optionally be filtered based on their size within the image (e.g., wherein the component size in pixels (and/or the size of its convex hull) falls outside a window of expected values associated with the cover). The metrics can include length metrics (e.g., horizontal length, vertical length, length of the shortest and/or longest diagonal), area metrics (e.g., area of the component or convex hull, area of a minimal bounding box, etc.), and/or any other suitable metrics. The metrics are preferably measured in terms of pixels and/or fractional amounts of the entire image, but can additionally or alternatively be measured relative to any other suitable reference value (e.g., using any suitable units). In one variation (e.g., in which a subset of the image is selected using a CNN or other computer vision technique), the extent of a component's convex hull (the fraction of pixels of the subset that are within the component's convex hull) is expected to fall between a minimum value (e.g., 2, 5, 10, 15, 20, 25, 30, 35, 40, 45, 50, 60, 70, 1-3, 3-10, 10-20, 20-30, 25-35, 30-40, 40-60, or 60-80%, etc.) and a maximum value (e.g., 30, 50, 60, 65, 70, 75, 80, 85, 90, 95, 98, 100, 10-40, 40-60, 60-80, 70-90, 80-95, or 90-100%, etc.). In some examples of this variation, the maximum and/or minimum values are determined based on the factor(s) by which the subset is scaled from the region detected by the CNN. In a specific example, the minimum value is 30% and the maximum value is 80%. However, the components can additionally or alternatively be filtered based on size in any other suitable manner.

The components can additionally or alternatively be filtered based on their shape and/or the shape of their convex hull (e.g., wherein one or more metrics associated with the shape falls outside a window of expected values associated with the cover). The metrics can include aspect ratio, orientation (e.g., orientation of the shortest and/or longest diagonal), curvature, geometric features such as circularity and/or eccentricity (e.g., as described below regarding the component features), and/or any other suitable metrics.

The components can additionally or alternatively be filtered based on any other suitable metrics (e.g., feature values such as described below regarding determining component features) and/or any other suitable criteria.

The expected values are preferably determined based on: intrinsic camera characteristics (e.g., focal length, sensor area, pixel density, etc.), a camera-vehicle distance, and one or more expected cover sizes (e.g., in physical units, such as cm) and/or shapes (e.g., the cover of a known vehicle model; a set of possible covers, such as wherein each possible cover is associated with a different vehicle of a set of supported vehicles; etc.). The camera-vehicle distance can be a known distance, estimated distance, expected distance, and/or any other suitable distance. The distance can be determined based on a distance sensor measurement (e.g., rangefinder, ToF sensor, contact distance sensor, etc.), measurements indicative of a reference feature (e.g., visual reference feature) with known dimensions, camera focus setting (e.g., wherein, when the camera is focused on the vehicle, the focal length and the distance from the rear nodal point of the camera optics to the image plane is used to calculate the distance from the front nodal point of the camera optics to the vehicle), radio connection information (e.g., existence of a short-range radio connection to the vehicle, RSSI of a radio connection to the vehicle, etc.), and/or any other suitable information.

However, the components can additionally or alternatively be filtered in any other suitable manner, or can remain unfiltered.

Determining component features can function to determine one or more metrics associated with the components and/or their convex hulls, preferably determining a set of values (e.g., feature vector) associated with each component.

The features preferably include rectangularity, more preferably rectangularity of the convex hull but additionally or alternatively rectangularity of the component itself. Rectangularity of an object (e.g., a component, the convex hull of the component, etc.) can be calculated as the ratio of the object area to the area of its minimal rectangular bounding box (e.g., an upright bounding box including only horizontal and vertical edges; a bounding box of arbitrary orientation, wherein the orientation is selected to minimize the bounding box area; etc.).

The features preferably include circularity, more preferably circularity of the convex hull but additionally or alternatively circularity of the component itself. circularity of an object (e.g., a component, the convex hull of the component, etc.) can be calculated as the ratio of the object area to the area of an isoperimetric circle (i.e., a circle with a perimeter equal to the object perimeter).

The features can additionally or alternatively include eccentricity (e.g., the ratio of the minor axis to the major axis) of the component and/or its convex hull, solidity (e.g., the ratio of a component's area to the area of its convex hull), convexity (e.g., the inverse ratio of a component's perimeter to the perimeter of its convex hull), and/or any other suitable features associated with the component and/or its convex hull.

The analysis can optionally include accounting for skew (e.g., due to yaw and/or other angular misalignment between the sensor and the vehicle). Accounting for skew can include determining a threshold amount of acceptable deviation from expected values for one or more of the features (preferably, for each feature). The threshold amount for each feature can be independent (e.g., ±0.02 for a first feature, ±0.05 for a second feature, etc.) or correlated (e.g., if a first feature value is lower than expected by a first amount, then a second feature value should be lower than expected by approximately a second amount, and a third feature value should be higher than expected by approximately a third amount, wherein the second and third amounts are determined based on the first amount). The magnitude of the threshold amounts can be determined based on an angular tolerance (e.g., yaw tolerance) associated with the system and/or method, based on a current vehicle yaw (e.g., determined based on sensor measurements), and/or based on any other suitable information.

Accounting for skew can additionally or alternatively include determining one or more affine transformations (e.g., associated with yaw and/or other skew corrections, such as yaw corrections within the yaw tolerance) of the components and/or convex hulls thereof. In one example, feature values (e.g., feature vectors) are determined for each such transformed version (e.g., thereby determining a plurality of feature vectors associated with each original component, such as one feature vector for each transformed version of the component), wherein matches to the values associated with any of the transformed versions can subsequently be determined. However, the method can additionally or alternatively include accounting for skew in any other suitable manner.

Figure 3A:
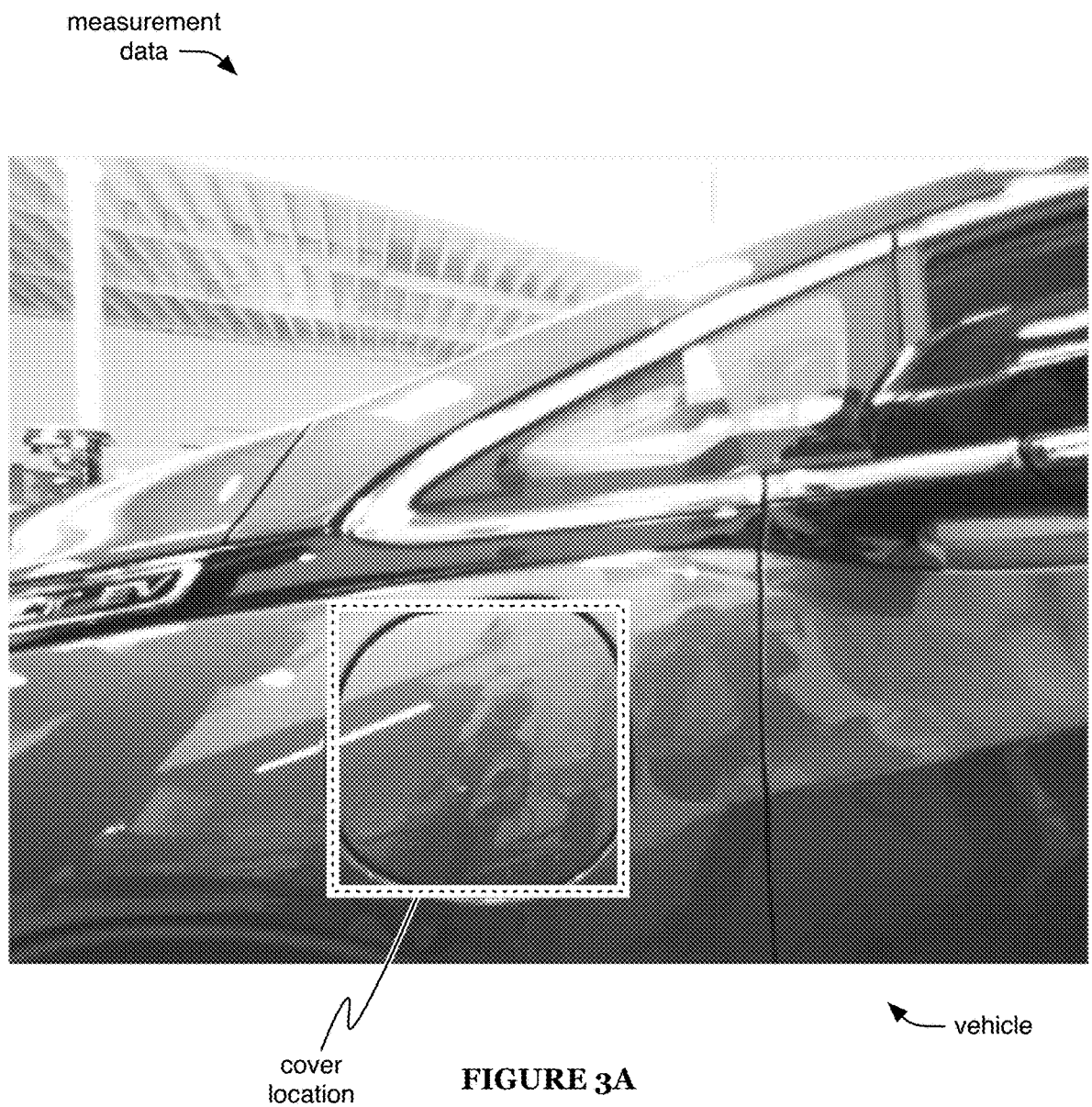
FIGS. 3A-3D are specific examples of locating the vehicle cover, actuation point, socket, and pins, respectively, in an example of the method.

Selecting a matching component preferably functions to identify the component associated with the cover (e.g., determining that a component is representative of the cover, and selecting the component based on that determination). Selecting the matching component can be performed by comparing the component features (e.g., original features, with skew corrections, etc.) to the expected features (e.g., stored set of feature vectors, each associated with a different supported vehicle model; if the vehicle model is known, the feature vector associated with that vehicle model; etc.). The component associated with the features that match the expected features (e.g., one of the feature vectors of the set of supported models) is preferably selected (e.g., matched within a threshold amount, such as the threshold associated with accounting for skew, an additional threshold to account for error, and/or any other suitable threshold; the closest match of all the components, etc.). The selected component can then be associated with the cover location within the image (e.g., as shown in FIG. 3A). In embodiments in which the vehicle model is not known before selecting the matching component, the vehicle model can be determined based on which stored feature vector the component is matched with. For example, selecting the matching component can include, based on a set of feature vectors (e.g., one feature vector corresponding to each component under consideration, such as each component of the edge map) and a set of one or more expected feature vectors (e.g., if the vehicle model is known, a single expected feature vector associated with that model; if the vehicle model is not known, an expected feature vector associated with each possible model and/or one or more generic expected feature vectors not associated with a particular model), selecting a candidate component as the match. The feature vectors can include one or more geometrical features and/or any other suitable features. However, the cover can additionally or alternatively be located in any other suitable manner.

If no match is selected (e.g., no components remain after filtering; no components match within the threshold tolerance; multiple components match, possibly such that no single component can be unambiguously selected; etc.) and/or the cover is not located for any other reason, analyzing the image can optionally include merging detected edges (e.g., as described above, such as regarding compensating for lens flare). After merging edges, the subsequent elements of analyzing the image (e.g., determining convex hulls, filtering components, determining component features, and/or selecting one or more matching components, etc.) are preferably performed using the modified edge map.

Additionally or alternatively, if no match is selected (e.g., after merging detected components, if no components are suitable for merging, if analyzing the image does not include searching for possible components to merge, etc.), S110 can include analyzing a different image and/or image region. In embodiments in which a subset of the region was selected (e.g., using a CNN or other computer vision technique, such as described above), this can include selecting an alternate subset of the image (e.g., corresponding to a lower-probability output of the computer vision technique, corresponding to use of a different computer vision technique, etc.), and performing the analysis (e.g., determining an edge map, filtering components, selecting a match, etc.) using the alternate subset. Additionally or alternatively, this can include sampling another image. For example, the sensor (and/or other elements of the system) can e relocated (e.g., based on the location of other vehicle features detected by the sensor, such as wheels, mirrors, doors and/or door handles, windows, etc., and based on the relative position of the vehicle features with respect to the cover, such as determined based on a vehicle model database; by a predetermined distance, such as 1, 2, 3, 5, 10, 0-3, 3-5, or 5-15 cm of translation, 1, 2, 3, 5, 10, 0-3, 3-5, or 5-15 degrees of rotation, etc.; until substantial changes in the sampled measurement are detected, such as changes in the captured image; etc.), and a new measurement indicative of the vehicle can be sampled and analyzed to locate the cover. Such relocation can change the reflections captured by the sensor and/or change the skew of the image, which may facilitate unambiguous detection of the cover. In some cases (e.g., in which the cover is not in the measurement region), such relocation can additionally or alternatively bring the cover into the measurement region (e.g., image frame).

However, S110 can additionally or alternatively include detecting the cover in any other suitable manner.

4.2 Determining a Cover Actuation Point.

Determining a cover actuation point S120 preferably functions to determine a location on the vehicle (e.g., on the cover) that can be actuated (e.g., pressed) to open (e.g., unlatch) the cover. The actuation point can include a mechanical actuation point (e.g., mechanical latch release), electrical actuation point (e.g., button or contact switch configured to control a cover opening mechanism), and/or any other suitable actuation point. S120 preferably includes determining the expected actuation point location relative to the cover, determining the cover position relative to the sensor, and moving the sensor based on the actuation point. S120 is preferably performed following (e.g., in response to completion of) S110, but can additionally or alternatively be performed at any other suitable time.

Figure 3B:
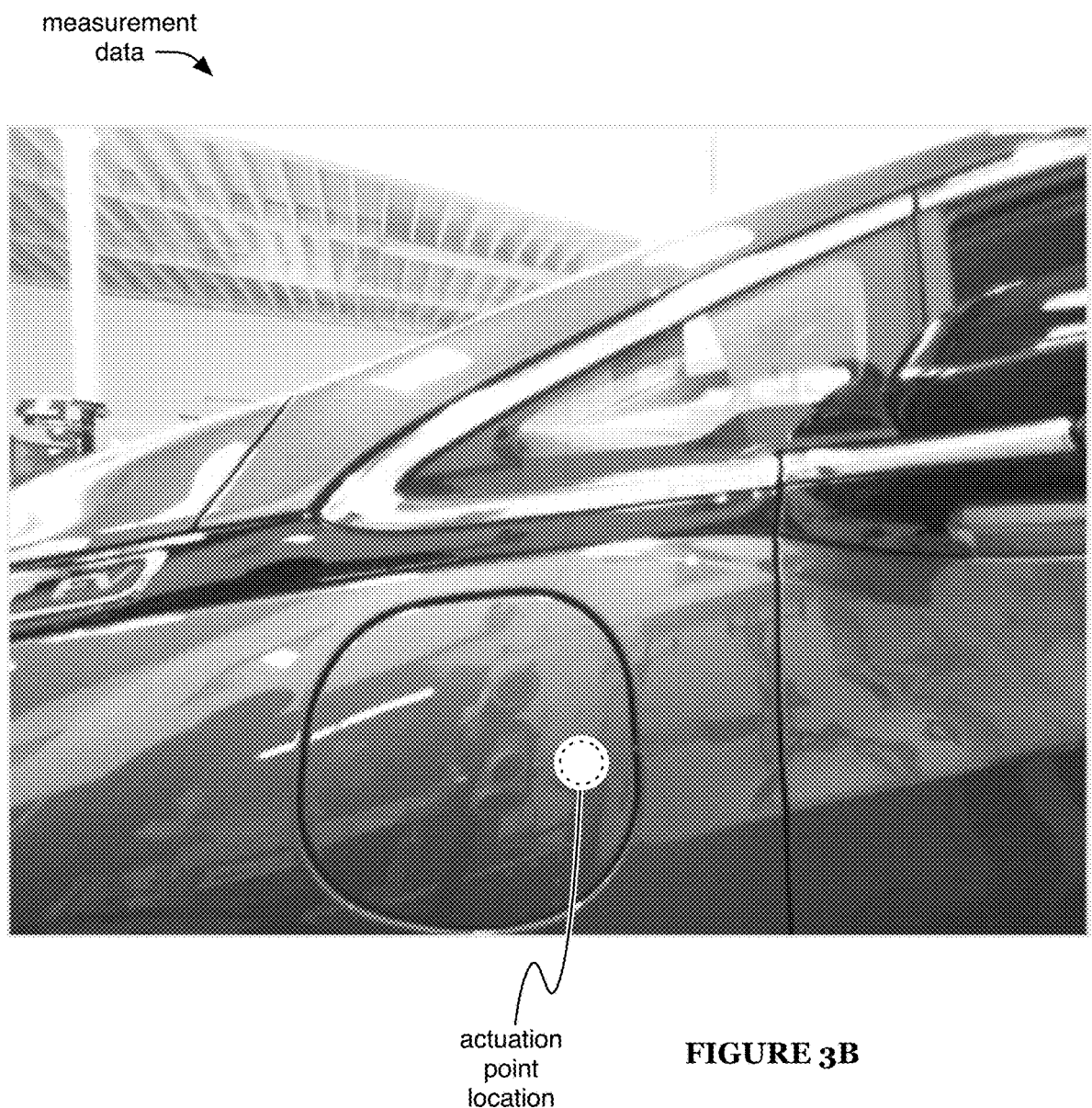

Determining the expected actuation point location relative to the cover is preferably performed receiving the expected point location based on cover and/or vehicle model information (e.g., looking up the expected point location in a database of supported vehicle models), but can additionally or alternatively be performed in any other suitable manner. The expected point location is preferably associated with a location within the sampled measurements (e.g., as shown in FIG. 3B). The location can be a location within the cover area, near the cover, and/or any other suitable location of the vehicle.

Determining the cover position relative to the sensor (e.g., determining the relative position and/or orientation of the vehicle and/or its cover with respect to the sensor) preferably functions to determine a depth (e.g., along a camera optical axis, vehicle cover normal axis, etc.) and relative orientation (e.g., yaw) between the sensor and cover. The depth and/or orientation can be a rough estimate (e.g., having accuracy such as 1, 3, 5, 7, 10, 15, 25, 0-4, 3-7, 6-10, or 10-25 mm, 1, 3, 5, 7, 10, 15, 25, 0-4, 3-7, 6-10, or 10-25 degrees, etc.) or can have any suitable accuracy. Determining the cover position is preferably performed based on the known cover size and/or shape (e.g., aspect ratio, outline, etc.), such as known based on the vehicle model and/or feature set matched in S110, and based on the selected component (e.g., selected in S110; component in subsequent images captured following S110, such as component tracked between captured images; etc.).

In a first embodiment, the relative position and/or orientation (e.g., depth and/or yaw) of the vehicle with respect to the sensor are determined based on one or more geometric features associated with the selected component. For example, determining the relative position and/or orientation can include determining a set of geometric features (e.g., the same as and/or different from the geometric features described above regarding S110) based on the selected component, and determining the relative position and/or orientation based on the set of geometric features. The set of geometric features can include, for example, one or more dimensions of the candidate component and/or derivatives thereof, such as aspect ratios. The dimensions can include length and/or area metrics associated with the component (or with derivatives thereof, such as the component's convex hull).

Figure 5:
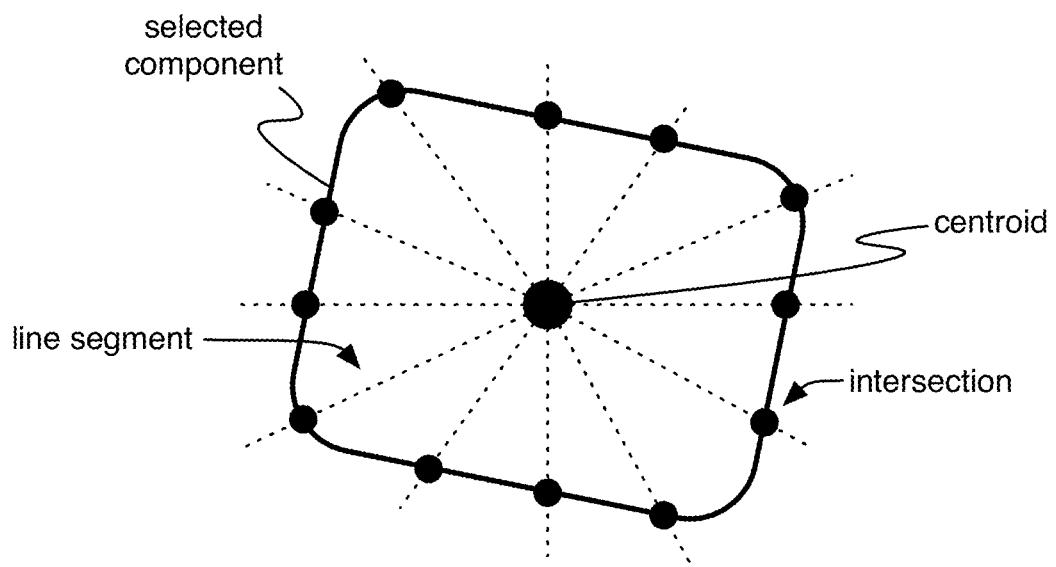
FIG. 5 is a schematic representation of an example of geometric features.

In a first example, determining the set of geometric features includes: determining a central point of the component (or a derivative thereof, preferably the convex hull), determining a plurality of line segments radiating outward from the central point, and determining a respective distance from the central point to the edge of the component (or its derivative, such as the convex hull) along each such line segment (distance from the central point to the intersection with the edge), wherein the set of geometric features preferably includes the respective distances (e.g., as shown in FIG. 5). The central point is preferably a centroid (e.g., spatial mean), but can additionally or alternatively include one or more spatial medians, medoids, other measures of central tendency, and/or any other suitable positions. The line segments are preferably regularly spaced (e.g., having equiangular spacing, such as spaced every 1, 2, 3, 4, 5, 6, 10, 15, 20, 30, 45, 60, 90, or 120°, etc.), but can alternatively have any other suitable spacing. The distances are preferably normalized, such as wherein a statistical metric (e.g., mean, median, standard deviation, etc.) of the normalized distances is equal to a predetermined value (e.g., 1). In a specific example, the centroid of the convex hull of the component is determined, line segments are determined radiating from the centroid every 2°, and the corresponding distances (e.g., normalized such that the standard deviation of the distances is 1) from the centroid to the edge of the convex hull can define a feature vector (or a portion thereof) of the set of geometric features.

In a second example, an aspect ratio is determined based on a vertical and horizontal dimension of the component (or derivative thereof, such as the convex hull). In a third example, an aspect ratio is determined based on a major axis and minor axis of the component (or derivative thereof, such as the convex hull).

Figure 6:
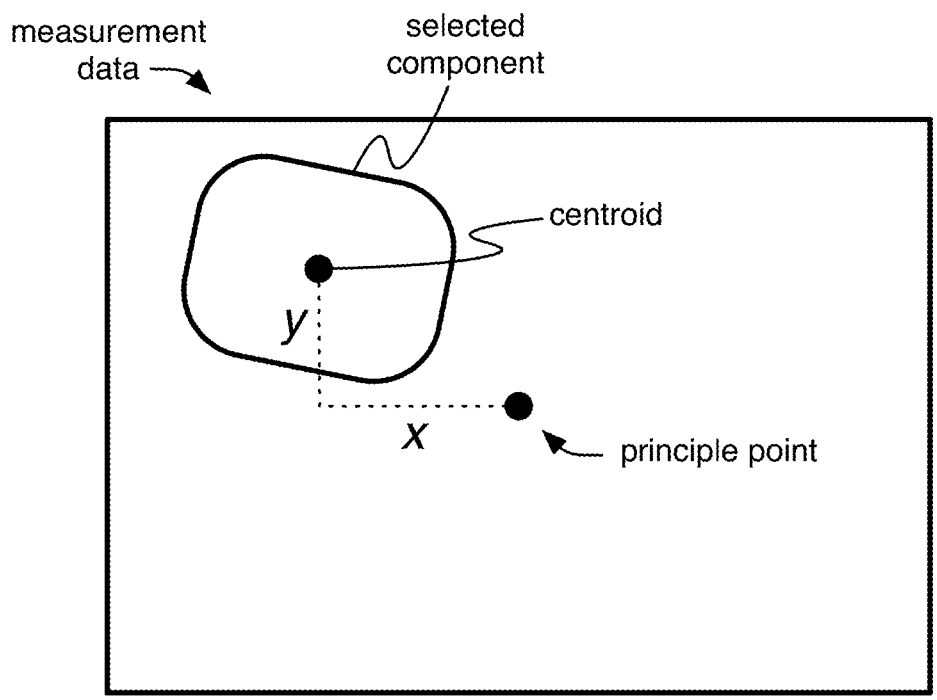
FIG. 6 is a schematic representation of an example of camera calibration features.

The relative position and/or orientation can be determined based further on one or more camera calibration features, such as features associated with lens distortion. The camera calibration features can include one or more focal lengths and/or metrics associated with the position of the component within the sampled image. For example, the position of the central point (e.g., centroid) of the component (or derivative thereof, such as its convex hull) relative to the principal point of the image (e.g., image center) can be expressed by the values x and y (e.g., wherein x represents horizontal displacement and y represents vertical displacement), such as shown in FIG. 6. Further, the effective focal length along the horizontal axis can be expressed by $f_x$, and the effective focal length along the vertical axis can be expressed by $f_y$. In one example, the camera calibration features include the ratios $f_x/x$ and $f_y/y$. However, the camera calibration features can additionally or alternatively include any other suitable features.

In one variation of this embodiment, the relative position and/or orientation are determined based on the expected and observed size and aspect ratio, such as based on trigonometric and/or arithmetic calculations (e.g., assuming a predefined pitch and roll, such as substantially zero pitch and roll). For example, the yaw can be determined based on a difference in aspect ratio, and the depth can be determined based on a difference in height (e.g., which will be substantially unaffected by changes in yaw).

In a second variation, the expected shape can be fit to the observed component (e.g., via affine transformation of the expected shape and/or observed component), wherein the relative position and orientation can be determined based on transformation associated with the best-fit match.

In a third variation, the geometric features (and/or any other suitable information) can be analyzed using one or more statistical analysis and/or machine learning tools. For example, a support vector machine (SVM), such as an SVM with a Gaussian kernel, can be used to determine the relative position and/or orientation (e.g., the yaw).

However, the set of geometric features can additionally or alternatively include any other suitable features, and/or the cover position can additionally or alternatively be determined in any other suitable manner (e.g., the relative position and/or orientation can be determined based further on any other suitable information).

Moving the sensor based on the actuation point (e.g., performing a camera repositioning based on the relative orientation and/or position) preferably functions to align the sensor (and/or any other suitable elements of the system) with the actuation point (e.g., based on the relative orientation, controlling the vehicle charging system to reposition the camera, preferably such that the camera and vehicle substantially define a desired relative orientation). In one embodiment, the sensor is moved (e.g., by the actuator) to attempt to achieve a desired orientation (e.g., zero yaw) relative to the vehicle, preferably with the actuation point substantially centered in the sensor sampling region (e.g., image frame), such as centered in the horizontal and/or vertical direction. The sensor preferably continues to sample measurements while moving, and the new measurements can be used, for example, to refine the relative position and/or orientation determination, to determine that the component selected in S110 is a false match (e.g., wherein method performance preferably returns to S110 in response, sampling and analyzing new sensor measurements to detect the cover), and/or for any other suitable purpose. In one example, in response to moving the sensor (e.g., to the desired orientation determined based on an initial yaw determination, toward the desired orientation, etc.), a new measurement (e.g., image) can be sampled, S110 can be performed using the new measurement (e.g., and based further upon the determinations made in S110 and/or S120), and/or the relative position and/or orientation (e.g., a revised relative position and/or orientation) can be determined using the new measurement (e.g., providing new inputs, determined based on the new measurement, to the same SVM). This example can include performing a second camera repositioning based on the revised relative position and/or orientation.

In one embodiment, the correlation between sensor motion (e.g., known based on actuator control) and changes in the sampled measurements can be used to refine and/or revise the depth determination. In one example (e.g., in which the sensor is a camera), one object in the measurement data is assumed to be the vehicle based on its depth (e.g., depth determined based on the correlation; wherein the object's determined depth substantially matches the earlier depth estimate, wherein the object is the closest object represented in the measurement data, etc.), and other objects represented in the measurement data (e.g., all other objects, a subset thereof, etc.) are expected to have an apparent depth of at least twice the vehicle depth (e.g., because the other objects are reflected images in the vehicle surface). In this example, the farther objects can be ignored for the purposes of depth determination, and the object assumed to be the vehicle can be used for depth determination. Optionally, if the measurement data does not meet this expectation (e.g., if the closest object is not close to the previously-estimated depth, if no object is close to the previously-estimated depth, etc.), the selected component can be determined to be a false match (e.g., wherein method performance preferably returns to S110 in response).

However, S120 can additionally or alternatively be performed in any other suitable manner.

4.3 Opening the Cover.

The method can optionally include opening the cover S130. S130 preferably functions to enable access to the vehicle charging connector. S130 is preferably performed following (e.g., in response to completion of) S120, but can additionally or alternatively be performed at any other suitable time.

S130 preferably includes moving the system (e.g., by controlling the actuator) to push the actuation point (e.g., using a vehicle contact element of the system, such as a portion of the charging connector) and then optionally to move back from the vehicle (e.g., allowing the cover to open, such as in embodiments in which the actuation point is located on the cover). Controlling an actuator of the vehicle charging system to actuate the cover is preferably performed based on a measurement (e.g., image) sampled after repositioning the camera (e.g., to substantially achieve the desired relative position and/or orientation), such as described above regarding S120. In one example (e.g., in which the actuation point is located on the cover, wherein a mechanical latch holding the cover closed is operable to be released by inward pressure at the actuation point), this includes: moving the system toward the actuation point, to a threshold distance (e.g., 1, 2, 3, 5, 10, 0-3, 2-5, or 4-10 cm, etc.) away from contact with the vehicle (determined based on the depth determined in S120); then continuing to move the system toward the vehicle slowly until contact is detected (e.g., from a change in motor back EMF, at a contact switch, etc.); then moving the system a predetermined distance farther toward the vehicle (e.g., cover actuation distance, such as a distance of inward cover movement required to release the latch, which can be determined from a vehicle model characteristics database and/or any other suitable information); then moving the system back away from the vehicle (e.g., allowing the cover to partially or fully open after depression of the actuation point). In a second example (e.g., in which the actuation point, preferably not located on the cover, corresponds to an electrical switch configured to release and/or open the cover in response to actuation), this includes: moving the system toward the actuation point, to a threshold distance (e.g., 1, 2, 3, 5, 10, 0-3, 2-5, or 4-10 cm, etc.) away from contact with the vehicle (determined based on the depth determined in S120); then continuing to move the system toward the vehicle slowly until contact is detected (e.g., from a change in motor back EMF, at a contact switch, etc.); then optionally moving the system a predetermined distance farther toward the vehicle (e.g., cover actuation distance, such as a distance of inward cover movement required to actuate the electrical switch, which can be determined from a vehicle model characteristics database and/or any other suitable information); then optionally moving the system back away from the vehicle. The position at which the system contacts the vehicle is preferably used to refine the depth determination (e.g., wherein depth is equal to zero at that position).

S130 can optionally include sampling additional measurement data after pushing the actuation point, wherein the additional data is preferably compared to data sampled before pushing the actuation point (e.g., to confirm successful cover actuation). For example, in embodiments in which pushing the actuation point causes the cover to open only partially (e.g., for a cover with no automatic opening mechanism), a change is expected at the cover edge, but not much change is typically expected in the middle of the cover and/or elsewhere in the measurement region. In one embodiment, in which the measurement data includes images, comparing the images can include comparing image histograms (e.g., of the entire image, of subsets thereof, such as subsets associated with the cover location, etc.). If the additional measurement data indicates that the cover may not have opened, the method preferably includes repeating one or more of S110, S120, and S130 in response.

S130 can optionally include refining the vehicle orientation determination. In one example, the system mechanically senses the vehicle orientation (e.g., before or after pushing the actuation point and/or subsequently comparing the measurement data) by contacting the vehicle (e.g., a vehicle body panel near the cover, such as past the open side of the cover), then moving along the vehicle while maintaining substantially the same degree of contact (e.g., wherein the body orientation is determined based on the direction of system motion while in contact with the vehicle), wherein system contact with the vehicle can be determined, for example, based on actuator back EMF changes, contact switches, and/or any other suitable contact detection techniques.

S130 can optionally include moving the cover to an open position (e.g., in embodiments in which the cover does not fully open in response to pushing the actuation point). In one example, a contact structure (e.g., notch) in the system contacts the edge of the cover, preferably an edge opposing a cover hinge across the cover (e.g., approaching from the side, such as by continuing to follow the vehicle surface during and/or after refining the yaw determination; approaching from the top or bottom; etc.), then moves backward and/or toward the cover hinge (e.g., while maintaining contact, such as indicated by actuator back EMF), such as continuing in the direction from which the cover edge was contacted, to open the cover.

However, S130 can additionally or alternatively include any other suitable elements performed in any suitable manner.

4.4 Locating the Vehicle Charging Connector.

Locating a charging connector of the vehicle S140 preferably functions to determine the location of the charging connector relative to the system. Although the vehicle charging connector is typically referred to herein as a socket, a person of ordinary skill in the art will recognize that S140 (and other elements of the method) can additionally or alternatively be performed for a plug and/or any other suitable charging connector of the vehicle. S140 is preferably performed following S130 (e.g., in response to performing S130), more preferably using measurement data sampled after performing S130, but can additionally or alternatively be performed at any other suitable time. The measurement data (e.g., image) is preferably sampled from a known sensor position (e.g., based on the depth and/or orientation determined as described above, such as in S130), more preferably from a standardized position (e.g., zero yaw, predetermined depth from the position of the closed cover or the expected position of the socket), but S140 can additionally or alternatively be performed using any suitable measurement data.

S140 preferably includes determining information associated with the socket (e.g., receiving the information from a database, such as a vehicle model database), such as socket type (e.g., CCS, CHAdeMO, etc.) and/or socket depth (e.g., relative to the system, relative to the position of the closed cover, etc.). Based on the socket information and the sensor position (e.g., at the time the measurement data was sampled), the expected socket image size (e.g., in pixels) is preferably determined.

The socket location within the measurement data (e.g., image, image region associated with the cover, etc.) is preferably determined based on the socket image size and/or other socket information (e.g., type). In one example, the location is determined by: sampling measurement data, selecting regions of the measurement data, and then choosing the region that is most likely to contain the socket. However, the socket location can be otherwise determined.

The regions are preferably equivalently shaped (e.g., rectangular, shape corresponding to the expected socket shape, etc.) and sized (e.g., based on the expected socket image size, such as equal to the expected size, greater than the size by a threshold amount, etc.), but can alternatively have different shapes and/or sizes. The regions are preferably arranged in a regular array, but can alternatively have any suitable arrangement. The regions are preferably overlapping regions (e.g., every possible region of the image, spaced by a predetermined number of pixels, equally spaced to generate a desired total number of regions, etc.) but can alternatively be non-overlapping (e.g., abutting, non-adjacent, etc.).

Figure 3C:
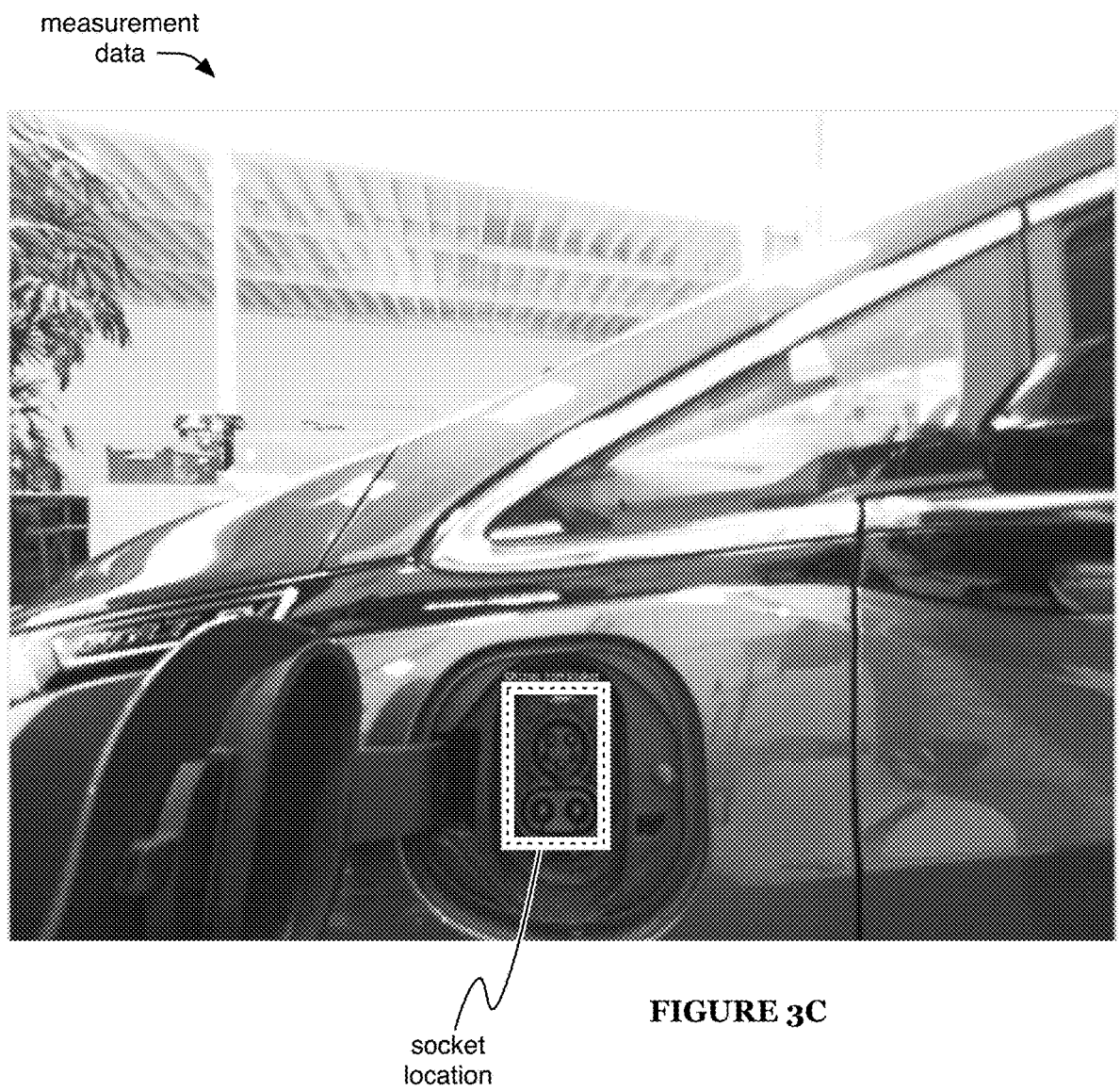

The regions are preferably analyzed (e.g., using image analysis and/or machine learning techniques) to determine which region is most likely to contain the socket. In one example, a pre-trained SVM, such as an SVM trained using Histogram of Oriented Gradients features, is used to score each region. The SVM can have a linear or nonlinear (e.g., polynomial, Gaussian, hyperbolic, etc.) kernel. The region with the highest score is preferably chosen as the region that is most likely to contain the socket (e.g., as shown in FIG. 3C). In a second example, a neural network (e.g., convolutional neural network) and/or other machine learning tool is used to choose the region. In response to choosing the region, S140 can optionally include moving the sensor to center the chosen region in the sensor frame (e.g., centered in the horizontal and/or vertical direction).

S140 can additionally or alternatively include estimating the location of the socket (e.g., based on a relative position and orientation of the vehicle with respect to the camera, such as determined as described above regarding S110 and/or S120). For example, S140 can include only estimating the location of the socket in this manner, and performing no additional image analysis and/or other techniques to refine this estimate.

However, S140 can additionally or alternatively be performed in any other suitable manner.

4.5 Locating Electrical Pins.

Locating electrical pins of the charging connector S150 preferably functions to determine a position and/or orientation of the electrical pins, thereby enabling connection to the pins. S150 is preferably performed in response to performing S140, but can additionally or alternatively be performed at any other suitable time. S150 preferably include sampling new measurement data (e.g., once the sensor is moved to center the chosen region in the sensor frame), wherein S150 is performed using the new measurement data, but can additionally or alternatively be performed using any other suitable measurement data (e.g., the data used to perform S140).

Figure 3D:
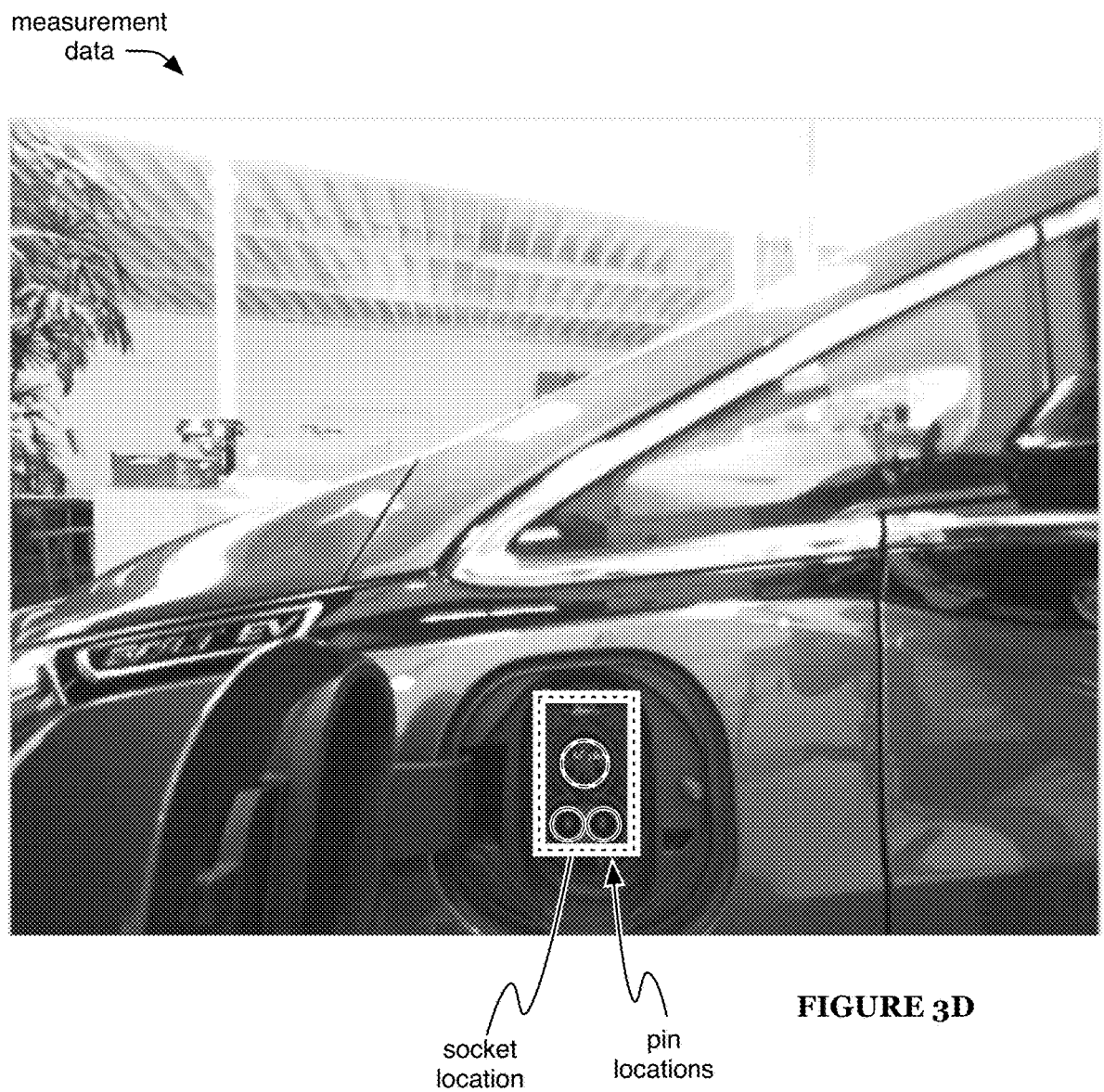

S150 preferably includes using one or more machine learning tools (e.g., pre-trained SVMs, such as SVMs trained using Histogram of Oriented Gradients features; neural networks; etc.) to locate one or more pins of the socket (e.g., AC pin set, DC pins, etc.). For example, the SVM(s) and/or other machine learning tools can be used to score regions selected from the image (e.g., analogous to the image regions of S140), such as circular regions and/or rectangular regions corresponding to the expected size of the pin region for which the SVM is trained (e.g., as shown in FIG. 3D).

The regions can be selected from within the chosen region of S140, from a region within a threshold distance of the chosen region of S140, from the entire image, and/or from any other suitable subset of the image. The tested regions can be arranged as described above regarding the regions of S140 and/or arranged in any other suitable manner. Based on the detected positions of all or some of the pins (e.g., at least 3 pins), correlated with the expected pin positions (e.g., determined based on the known connector type), a precise location (e.g., depth, horizontal, and/or vertical position, preferably all three) and orientation (e.g., pitch, roll, and/or yaw, preferably at least pitch and roll) of the socket can be determined.

The regions can optionally be selected based on an objective search algorithm, such as a search over the image data (or a subset thereof, such as the chosen region or a region within a threshold distance of the chosen region) performed with the objective of maximizing the region score (e.g., score determined using the machine learning tool). The search can be a local optimum search (e.g., gradient descent), a global optimum search (e.g., exhaustive search considering all possible regions, non-exhaustive search such as a stochastic search, etc.), and/or any other suitable search. In some examples (e.g., in which a first search, such as a local search, fails to achieve a region score above a threshold value), a second objective search (e.g., based on the same objective) can be performed. The second search can be a local search beginning from a different location within the image, a global search, a longer or more exhaustive search than the first search, and/or any other suitable search.

In a first example, S150 includes locating the AC pins (e.g., using a machine learning tool trained to locate only the AC pins), which can enable use of the same techniques (e.g., the same SVM or other machine learning tool) across all or substantially all vehicle models (e.g., across substantially all charging port types, which typically have the same AC pin arrangement). In a second example, S150 includes locating one or more DC pins (e.g., in addition to or in place of the AC pins).

However, S150 can additionally or alternatively include any other suitable elements performed in any suitable manner.

4.6 Connecting to the Vehicle.

The method can optionally include connecting to the vehicle S160 (e.g., electrically and/or mechanically connecting the charging connector of the system to the vehicle socket), which preferably functions to enable vehicle charging. S160 is preferably performed in response to performing S150, but can additionally or alternatively be performed at any other suitable time. S160 is preferably performed based on the socket position and orientation (e.g., determined as described above, such as in S150).

To connect to the vehicle, the charging connector is preferably moved based on the socket position and orientation. For example, the charging connector orientation can be adjusted to align it with the socket, centered along the connection axis, and then moved toward the socket along the connection axis (e.g., by the known depth). After attempting to connect, the success of the connection is preferably determined (e.g., based on actuator back EMF, based on continuity of an electrical connection to the vehicle, etc.). If the connection succeeds, S150 optionally includes moving inward (e.g., farther along the connection axis; along an engagement axis different than the connection axis, such as an axis with orientation determined based on the vehicle model database; etc.) to fully engage (e.g., mechanically engage) the connector in the socket. If the connection fails, S150 preferably includes re-attempting to connect, using a different presumed socket position and/or orientation (e.g., determined based on the next-best region score determined during S150, random perturbation of a previous attempt, etc.).

S160 can optionally include charging the vehicle (e.g., by providing electrical power via the connection, such as to charge batteries of the vehicle). The vehicle is preferably charged after connecting to the vehicle (e.g., in response to connecting), but can additionally or alternatively be charged at any other suitable time. However, S160 can additionally or alternatively include connecting to the vehicle in any other suitable manner.

4.7 Disconnecting from the Vehicle.

The method can optionally include disconnecting from the vehicle S170, which preferably functions to stow the system in the waiting configuration and/or enable the vehicle to depart from the proximity of the system. S170 can be performed: when done charging the vehicle (e.g., when the vehicle battery is full or above a threshold charge state, when charging account credit associated with the vehicle is depleted, when a maximum charging time interval has elapsed, etc.), in response to a disconnection request (e.g., received from the vehicle, a user device, a remote computing system, etc.), at a scheduled time (e.g., determined based on a planned vehicle departure time), and/or at any other suitable time.

S170 can include: retracting the system past the cover depth, closing the cover (e.g., based on the actuation point determined in S120), and/or sampling a measurement (e.g., and comparing it to one or more earlier measurements, such as measurements sampled before, during, and/or after S120) to verify successful cover closure. However, S170 can additionally or alternatively be performed in any suitable manner, and the method can additionally or alternatively include any other suitable elements.

Although elements of the method may be described as being performed using a single image, a person of ordinary skill in the art will understand that such elements can additionally or alternatively be performed using multiple image frames (e.g., each element performed using all such frames; different elements performed using different frames, such as subsequently-performed elements being performed using subsequently-captured frames, etc.) and/or using any suitable measurement data or derivative thereof.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for facilitating automated vehicle charging, comprising:
   at a camera of a vehicle charging system, capturing an image depicting a portion of a vehicle, the portion comprising a cover arranged between the camera and a charging connector of the vehicle;
   based on the image, determining an edge map defining a set of components;
   determining a set of feature vectors, comprising, for each component of the set, determining a respective feature vector based on the component;
   based on the set of feature vectors and a set of expected feature vectors for a cover, selecting a candidate component;
   based on the candidate component, determining a set of geometric features;
   based on the set of geometric features, determining a relative orientation of the vehicle with respect to the camera; and
   based on the relative orientation, controlling the vehicle charging system to reposition the camera such that the camera and vehicle substantially define a desired relative orientation.

2. The method of claim 1, wherein determining the edge map comprises:
   determining a subset of the image, wherein the subset depicts the cover; and
   detecting a set of edges within the subset of the image, wherein the edge map is representative of the set of edges.

3. The method of claim 2, wherein determining the subset of the image comprises detecting a depiction of the cover using a neural network.

4. The method of claim 2, wherein the set of components consists of a component.

5. The method of claim 1, wherein, for each component of the set, the respective feature vector comprises a respective circularity feature.

6. The method of claim 5, wherein, for each component of the set, determining the respective circularity feature comprises:
   determining a convex hull of the component; and
   determining a circularity of the convex hull, wherein the respective circularity feature is equal to the circularity.

7. The method of claim 5, wherein, for each component of the set, the respective feature vector further comprises at least one of a respective eccentricity feature and a respective rectangularity feature.

8. The method of claim 1, wherein the set of geometric features comprises a candidate component aspect ratio.

9. The method of claim 1, wherein the set of geometric features comprises a plurality of candidate component dimensions.

10. The method of claim 1, wherein the set of geometric features further comprises a candidate component location within the image.

11. The method of claim 1, wherein controlling the vehicle charging system to reposition the camera comprises:
   based on the relative orientation, performing a first camera repositioning;
   after performing the first camera repositioning, capturing a second image at the camera;
   based on the second image, determining a revised relative orientation of the vehicle with respect to the camera; and
   based on the revised relative orientation, performing a second camera repositioning.

12. The method of claim 1, further comprising, after controlling the vehicle charging system to reposition the camera:
   at the camera, capturing a second image depicting the cover; and
   based on the second image, controlling an actuator of the vehicle charging system to actuate the cover.

13. The method of claim 12, wherein the actuator is rigidly coupled to the camera.

14. The method of claim 12, wherein controlling the actuator to actuate the cover comprises, based on the second image:
   determining a location of a cover actuation point;
   determining a distance between the actuator and the cover actuation point; and
   controlling the actuator to contact the cover actuation point.

15. The method of claim 1, further comprising, after controlling the vehicle charging system to reposition the camera:
   opening the cover;
   at the camera, capturing a second image depicting the charging connector;
   based on the second image, determining a location of the charging connector relative to the camera; and
   based on the location, connecting an electrical power supply to the charging connector.

16. A method for facilitating automated vehicle charging, comprising:
   at a camera of a vehicle charging system, capturing an image depicting a portion of a vehicle, the portion comprising a cover arranged between the camera and a charging connector of the vehicle;
   using a computer vision technique, determining a location of a depiction of the cover within the image;
   based on the location, determining a subset of the image, wherein the subset depicts the cover;
   determining an edge map of the subset of the image, the edge map defining a component;
   based on the component, determining a set of geometrical features; and
   based on the set of geometrical features and a set of expected geometrical features for the cover, determining that the component is representative of the cover.

17. The method of claim 16, wherein using the computer vision technique comprises providing the image to a region-based convolutional neural network.

18. The method of claim 2, wherein determining the edge map comprises:
   using a first edge detection threshold, detecting a first set of edges within the subset of the image;
   based on the first set of edges, determining a first edge pixel count;
   determining that the first edge pixel count is not within an expected edge pixel count range;
   based on the first edge pixel count, determining a second edge detection threshold different from the first edge detection threshold; and
   in response to determining that the first edge pixel count is not within the expected edge pixel count range, using the second edge detection threshold, detecting a second set of edges within the subset of the image, wherein the edge map comprises the second set of edges.

19. The method of claim 18, wherein determining the edge map further comprises, based on the second set of edges, determining a second edge pixel count, wherein the second edge pixel count is within the expected edge pixel count range.

20. The method of claim 16, further comprising, after determining that the component is representative of the cover:
   based on the image, determining a relative position and orientation of the cover with respect to the camera; and
   based on the relative position and orientation, controlling the vehicle charging system to actuate the cover.

* * * * *